United States Patent

Shimizu et al.

[11] Patent Number: 5,996,724
[45] Date of Patent: *Dec. 7, 1999

[54] STEERING CONTROL SYSTEM

[75] Inventors: Yasuo Shimizu; Tsunehiko Fukatsu; Hiroyuki Tokunaga, all of Wako, Japan

[73] Assignee: Honda Giken Kabushiki Kaisha, Tokyo, Japan

[ * ] Notice: This patent is subject to a terminal disclaimer.

[21] Appl. No.: 08/926,582

[22] Filed: Sep. 4, 1997

Related U.S. Application Data

[63] Continuation-in-part of application No. 08/704,968, Aug. 28, 1996, Pat. No. 5,729,107.

[30] Foreign Application Priority Data

Sep. 5, 1996 [JP] Japan ..... 8-255572

[51] Int. Cl.$^6$ ..... B62D 5/04
[52] U.S. Cl. ..... 180/446; 701/41; 701/42
[58] Field of Search ..... 180/446, 422, 180/423; 701/41, 42

[56] References Cited

U.S. PATENT DOCUMENTS

| | | | |
|---|---|---|---|
| 5,729,107 | 3/1998 | Shimizu et al. | 180/446 |
| 5,764,015 | 6/1998 | Shimizu et al. | 180/446 |
| 5,767,642 | 6/1998 | Furukawa et al. | 180/446 |
| 5,774,819 | 6/1998 | Yamamoto et al. | 180/446 |
| 5,828,972 | 10/1998 | Asanuma et al. | 180/446 |

*Primary Examiner*—Lanna Mai
*Assistant Examiner*—MIchael Cuff
*Attorney, Agent, or Firm*—Skjerven, Morrill, MacPherson, Franklin & Friel LLP; Alan H. MacPherson; Hugh H. Matsubayashi

[57] ABSTRACT

In a steering control system for a motor vehicle, the magnitude of the steering assist torque is reduced from a normal value by a value depending on the ratio of the steering angle to a maximum permissible steering angle which is determined according to the frictional coefficient between the road surface and the road wheels so that excessive steering, which may otherwise occur on a slipper road surface, can be avoided. Additionally, the value by which the steering assist torque is reduced is increased with an increase in the steering speed so that a certain damping effect may be achieved in the system. This is particularly beneficial in preventing any ill effect which may arise when the steering wheel has a large mass of inertia, for instance by being equipped with an air bag system.

9 Claims, 7 Drawing Sheets

STEERING CONTROL SYSTEM

CROSS REFERENCE TO RELATED APPLICATIONS

This application is a continuation-in-part of application Ser. No. 08/704,968, filed Aug. 28, 1996, now U.S. Pat. No. 5,729,107.

TECHNICAL FIELD

The present invention relates to a steering control system which employs an assist steering torque to assist the effort required to steer the vehicle, and in particular to a steering control system which is both adaptive to different road conditions and stable during operation.

BACKGROUND OF THE INVENTION

Electric power steering systems comprise a manual steering system for converting a turning angle of a steering wheel to a steering angle of road wheels, and an electric motor incorporated therein to provide an assist steering torque to the manual steering system so as to reduce the effort required for the vehicle operator to turn the steering wheel. However, such conventional electric power steering systems did not take into account changes in the road condition on which the resistance to the steering effort depends, and it is known that the assist torque tended to be excessive when the frictional coefficient between the road surface and the wheels is low such as when the road surface is covered with snow. An excessive steering assist torque tends to cause an excessive steering, and creates some discomfort to the vehicle operator.

To overcome such problems or to control such an excessive steering on slippery road surfaces, it was proposed in the U.S. patent application Ser. No. 08/704,968 filed Aug. 28, 1996 now U.S. Pat. No. 5,729,107, and assigned to the same Assignee to control the steering assist torque of a power steering system depending on the road condition, in particular the frictional coefficient between the road surface and the wheels. The contents of this copending application are hereby incorporated in this application by reference.

However, it was later discovered that the control action of this previously proposed system may not be adequate when the steering system involves a large inertia. In particular, when the steering wheel is equipped with an air bag system, the increase in the moment of inertia of the steering system is so significant that a certain improvement of the system was felt necessary.

BRIEF SUMMARY OF THE INVENTION

In view of such problems of the prior art and the recognition by the Inventors, a primary object of the present invention is to provide a steering control system which can provide a proper amount of assist steering torque at all times and can ensure the steering stability at the same time.

A second object of the present invention is to provide a steering control system which can properly control steering assist torque even when the mass of inertia of the steering system is significant such as when the steering wheel is equipped with an air bag system.

A third object of the present invention is to provide a steering control system which can properly control steering assist torque which is simple in structure, and is therefore reliable in operation and economical to implement.

According to the present invention, these and other objects can be accomplished by providing a steering control system for a motor vehicle, comprising: steering torque detecting means for detecting a steering input torque applied to an input end of a steering system; steering angle detecting means for detecting a steering angle; steering angular speed detecting means for detecting a change rate of the steering angle; means for estimating a frictional coefficient of a road surface on which the vehicle is traveling; maximum steering angle defining means for defining a maximum permissible steering angle according to a frictional coefficient estimated by the frictional coefficient estimating means; and target torque computing means for determining a target output torque of a power actuator for the steering system according to outputs from the steering torque detecting means, the steering angle detecting means, the steering angular speed detecting means, and the maximum steering angle defining means.

When the steering system involves a large mass of inertia such as when the steering wheel is equipped with an air bag system, an excessive steering action tends to occur. Therefore, by making the target output torque of the power actuator dependent on the steering angular speed, it is possible to mitigate such a tendency. In particular, by adding a damping force which opposes a steering effort in dependence on the steering speed, it is possible to significantly improve the steering handling of the vehicle. For instance, the target output torque of the power actuator may be reduced from a normal value, which is computed according to a magnitude of the detected steering angle in relation with the maximum permissible steering angle, in dependence on a magnitude of the steering angle change rate.

Preferably, the target output torque is given as an assist steering torque minus a supplemental steering torque, and the target torque computing means comprises assist steering torque computing means for computing the assist steering torque according to the output from the steering torque detecting means, and supplemental steering torque computing means for computing the supplemental steering torque according to the outputs from the steering angle detecting unit, the steering angular speed detecting unit, and the frictional coefficient estimating means. Thus, the present invention can be implemented with a minimum modification to the previously proposed system.

The steering torque detecting means may comprise a torque sensor provided in a path of torque transmission from the steering wheel to the steering mechanism. The steering angle detecting means may comprise a steering angle sensor for detecting a turning angle of a steering shaft extending from the steering wheel, and the steering angular speed detecting means may comprise a differentiator for differentiating the output of the steering angle sensor with respect to time. In particular, when the power actuator comprises an electric motor, the actual rack reaction may be computed from the steering torque, and an electric voltage and an electric current supplied to the electric motor, and the change rate of the steering angle may be computed from an electromotive force produced in the electric motor. This, in particular, allows the entire system to be constructed in an economical and reliable manner.

Typically, the frictional coefficient estimating means comprises a vehicle model for providing a reference rack reaction with respect to a given steering angle, rack reaction measuring means for measuring an actual rack reaction, and computing means for giving a road frictional coefficient according to a ratio of increments of the reference rack reaction and the actual rack reaction for a given increment of the steering angle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
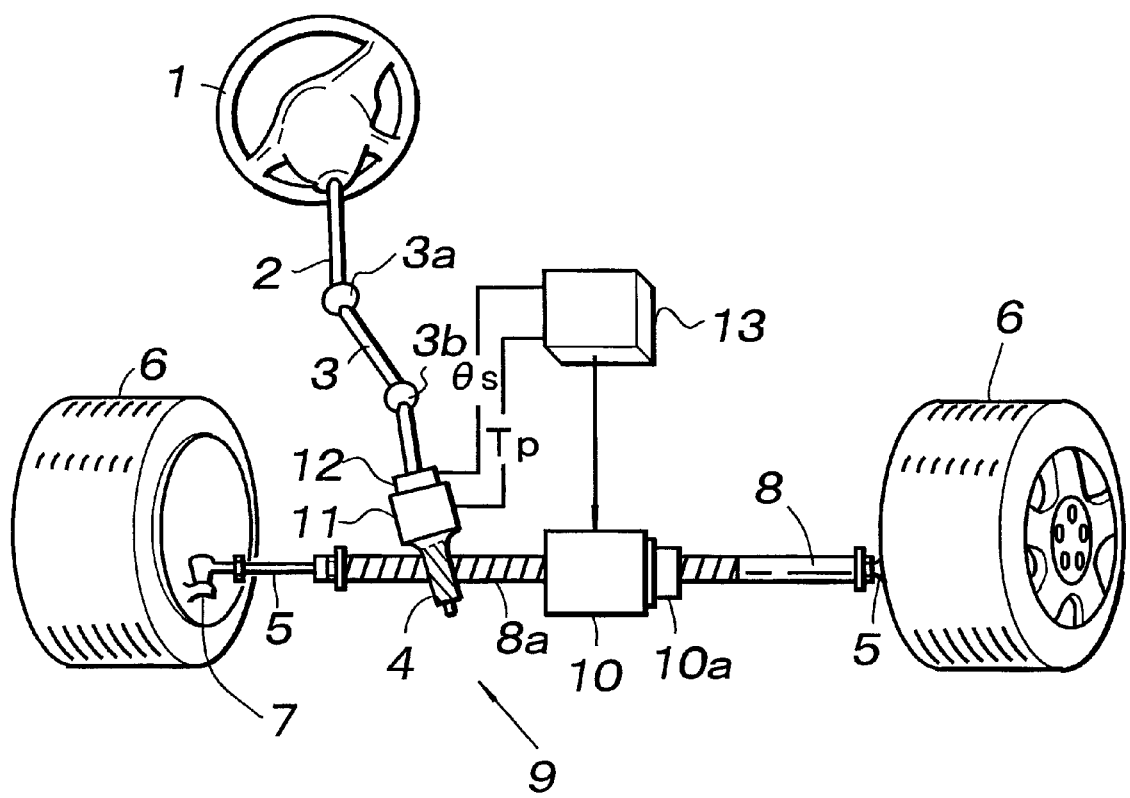
FIG. 1 is a diagrammatic view of the steering system to which the present invention is applied.

FIG. 1 illustrates an electric power steering system to which the present invention is applied. A steering wheel 1 is attached to an upper end of a steering shaft 2, and a lower end of the steering shaft 2 is connected to a pinion 4 via a connecting shaft 3 which is provided with universal joints 3a and 3b at two ends thereof. The pinion 4 meshes with a rack 8a which is formed in a rack shaft 8 extending laterally of the vehicle body and guided to move along a longitudinal axial line thereof. The two ends of the rack shaft 8 are connected to knuckle arms 7 of right and left front wheels 6 via tie rods 5. This manual steering system is generally denoted with numeral 9 in FIG. 1. To provide a power assist to this steering system, an electric motor 10 is coaxially combined with the rack shaft 8 for axially actuating the rack shaft 8. The electric motor 10 is incorporated with a ball screw mechanism for converting the rotational movement of the motor 10 to an axial force of the rack shaft 8. A steering torque sensor 11 and a steering angle sensor 12 are provided in appropriate parts of the steering system, such as the steering shaft 2, to detect the magnitude of the steering effort applied to the steering wheel 1 by the vehicle operator, and the steering angle of the steering wheel 1, respectively. The electric motor 10 is controlled by a controller 13 which receives output signals Tp and θs from these sensors 11 and 12.

Figure 2:
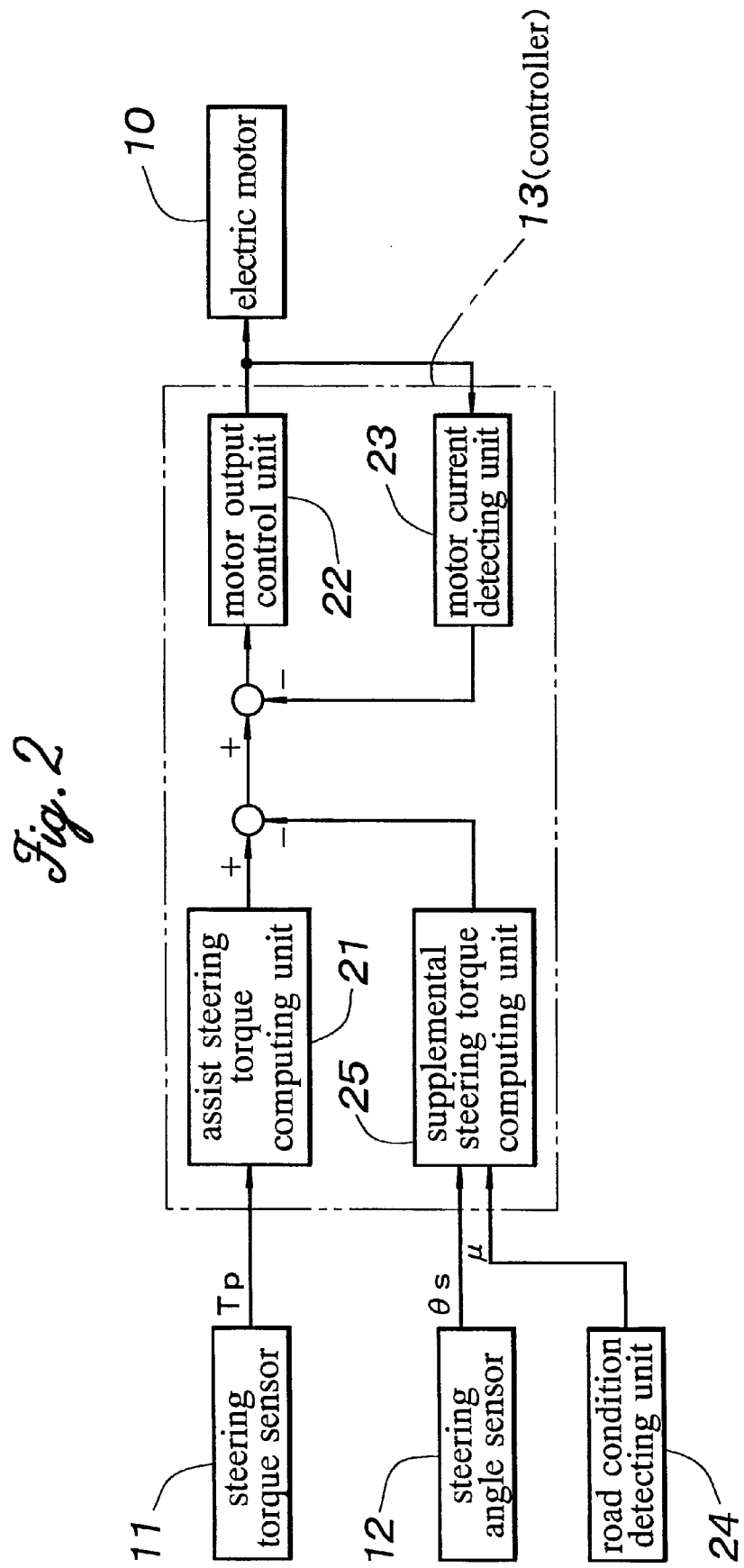
FIG. 2 is a block diagram of a preferred embodiment of the steering control system according to the present invention.

The controller 13 essentially consists of an assist steering torque control segment and an excessive steering torque control segment. Referring to FIG. 2, the assist steering torque control segment comprises an assist steering torque computing unit 21 for setting a target assist steering torque which should be produced from the electric motor 10 according to the output Tp from the steering torque sensor 11, a motor output control unit 22 for controlling the output of the electric motor 10 according to the thus set target of the motor output, and a motor current detecting unit 23 for detecting and feeding back the current conducted through the electric motor 10. The excessive steering torque control segment comprises a road condition detecting unit 24 for detecting the frictional coefficient $\mu$ between the road surface and the road wheels, and a supplemental steering torque computing unit 25 for determining the supplemental steering torque that should be applied to the steering wheel 1 according to the outputs $\mu$ and θs from the road condition detecting unit 24 and the steering angle sensor 12. In this embodiment, the output of the supplemental steering torque computing unit 25 is subtracted from the output of the assist steering torque computing unit 21.

Figure 3:
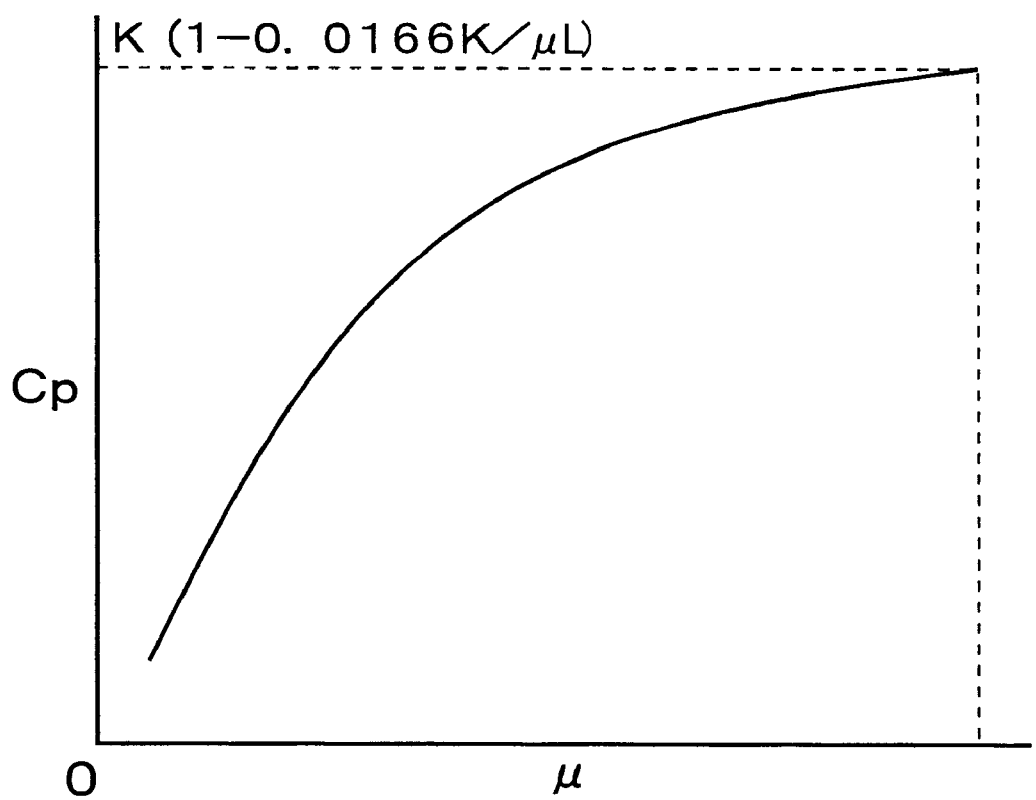
FIG. 3 is a graph showing the relationship between the cornering power and the road frictional coefficient.

A method for estimating the road frictional coefficient $\mu$ in the road condition detecting unit 24 is described in the following. The cornering power Cp of a tire can be expressed as given in the following according to Fiala's equation (a second order approximation).

$$Cp = K(1 - 0.0166 K/\mu L)$$

where K is the cornering stiffness, $\mu$ is the road frictional coefficient, and L is the wheel load. In other words, because the tire cornering power Cp diminishes with a reduction in the road frictional coefficient $\mu$ (see FIG. 3), the rack shaft reaction which the rack and pinion gear system receives from the road surface for a given steering angle diminishes with a reduction in the road frictional coefficient $\mu$ because rack reaction is proportional to the moment caused by the cornering power around the virtual kingpin. Therefore, by actually measuring the steering angle and the rack shaft reaction, and comparing the actual rack shaft reaction for a given steering angle with a reference rack shaft reaction, it is possible to estimate the road frictional coefficient $\mu$.

The actually measured rack shaft reaction Frc or the road reaction can be estimated from the steering torque Ts, the motor voltage Vm, and the motor current Im as described in the following. First of all, the output torque Tm of the electric motor for providing the assist steering torque in the electric power steering system can be given by the following equation.

$$Tm = Kt \cdot Im - Jm \cdot \theta m'' - Cm \cdot \theta m' \pm Tf$$

where Kt: motor torque constant
Im: motor current
Jm: moment of inertia of the rotor of the electric motor
θm': angular speed of the electric motor
θm'': angular acceleration of the electric motor
Cm: damping coefficient of the electric motor
Tf: frictional torque The damping coefficient, the moment of inertia, and the frictional resistance regarding the movement of the steering shaft and the frictional resistance to the movement of the motor may be disregarded as they are small. Then, the balance of forces for the rack shaft can be approximated by the following equation.

$$\begin{aligned} Fr &= Fs + Fm \\ &= Ts/rp + N(Kt \cdot Im - Jm \cdot \theta m'' - Cm \cdot \theta m') \end{aligned}$$

where Fr: rack shaft reaction from the road surface
Fs: rack shaft axial force applied from the pinion
Fm: rack shaft axial force applied by the motor
Ts: actual steering torque applied to the steering shaft
rp: pinion radius
N: motor output gear ratio The angular speed of the motor θm' can be found either by differentiating the steering wheel angle θs or by applying the following equation to the electromotive force produced from the motor.

$$\theta m' = (Vm - Im \cdot Rm)/Km$$

where Vm : voltage across the motor
Rm: electric resistance of the motor
Km: inductive voltage constant of the electric motor Precisely speaking, the angular speed of the motor θm' and the angular speed of the steering wheel θs' are not identical to each other. The angular speed of the motor θm' can be computed from the angular speed of the steering wheel θs' which is obtained by differentiating the steering wheel angle θs according to the following equation.

$$\theta m' = \theta s' - Ts'/Ks$$

where Ks: spring constant of the torque sensor

Ts': differentiated value of the steering torque

The angular acceleration of the motor θm' can be obtained by differentiating the angular speed of the motor θm'.

Figure 4:
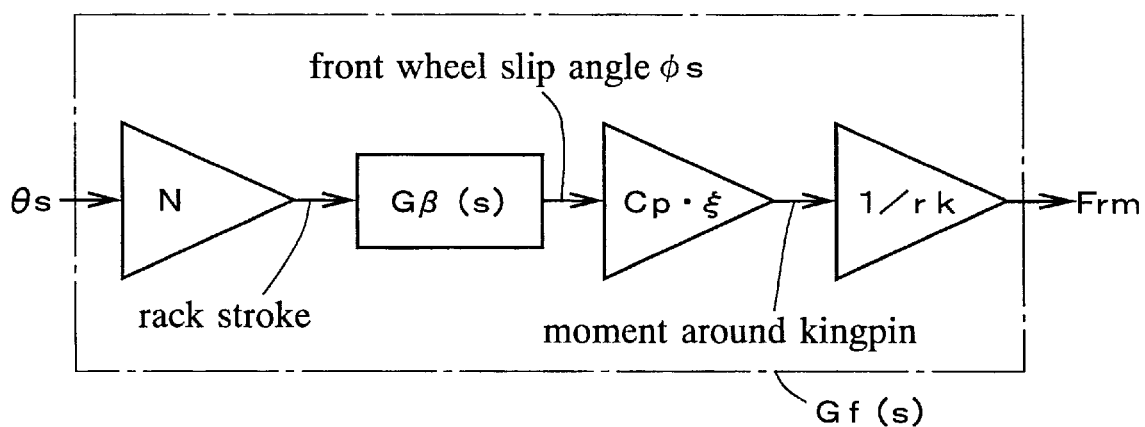
FIG. 4 is a flow chart showing the construction of the internal model.

The internal model for generating the reference value for the rack shaft reaction is determined as described in the following. Referring to FIG. 4, the steering angle θs given from the steering wheel 1 is converted into a certain stroke of the rack shaft 8 according to a transmission ratio between the rack 8a and the pinion 4. A side slip angle of the front wheels φs is produced in response to the stroke of the rack shaft 8. The transfer function Gβ(s) of the front wheel side slip angle φs with respect to the stroke of the rack shaft 8 changes with a change in a stability factor resulting from a change in the road frictional coefficient μ.

Multiplying the front wheel side slip angle φs by the cornering power Cp and the trail ξ (caster trail+pneumatic trail) produces a moment around the kingpin. The cornering power Cp and the trail ξ are dependent on the road frictional coefficient μ and the wheel contact load L. Dividing the moment around the kingpin by the distance between the pivot center of the wheel and the center of the rack shaft or the knuckle arm length rk produces a model rack shaft reaction Frm.

From the above description, it can be appreciated that the response of the model rack shaft reaction Frm to the steering wheel angle θs can be represented by a single transfer function Gf(s) which can be either computed from various specifications of the vehicle or identified by a measurement of the actual behavior of the vehicle.

Figure 5:
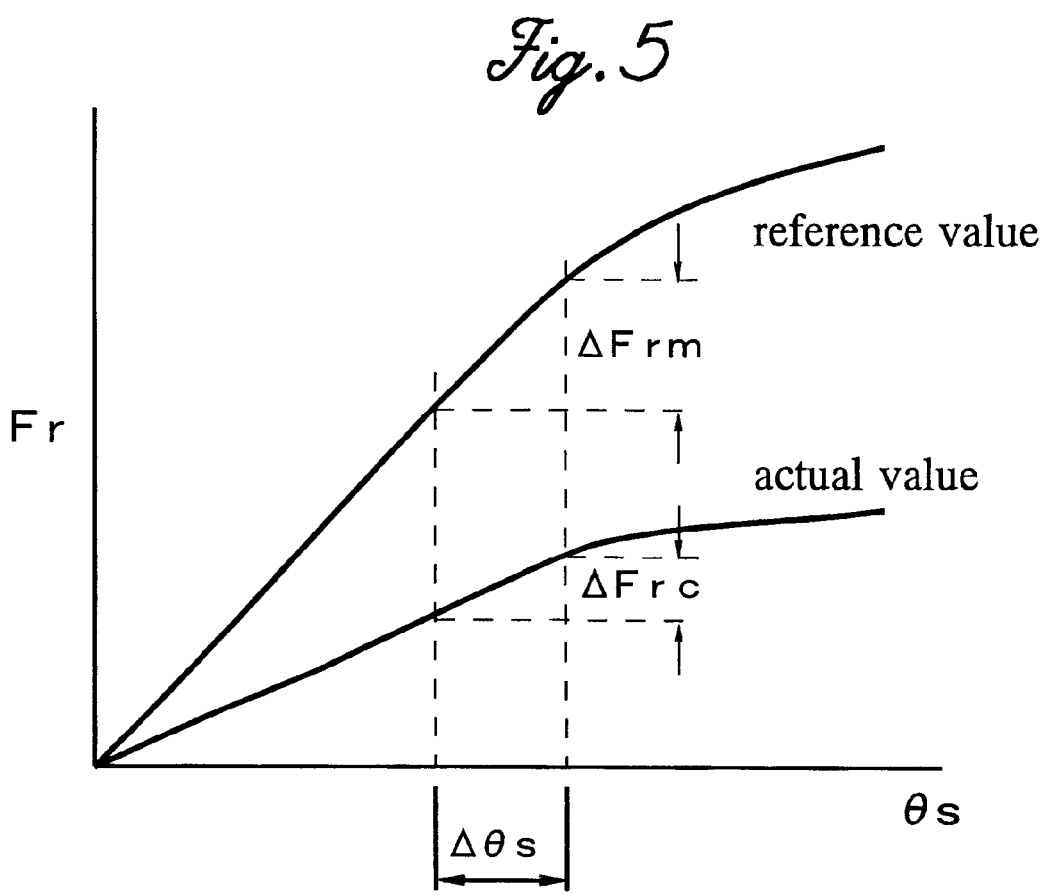
FIG. 5 is a graph showing the responses of the model and reference rack shaft reactions to different steering angles.
Figure 6:
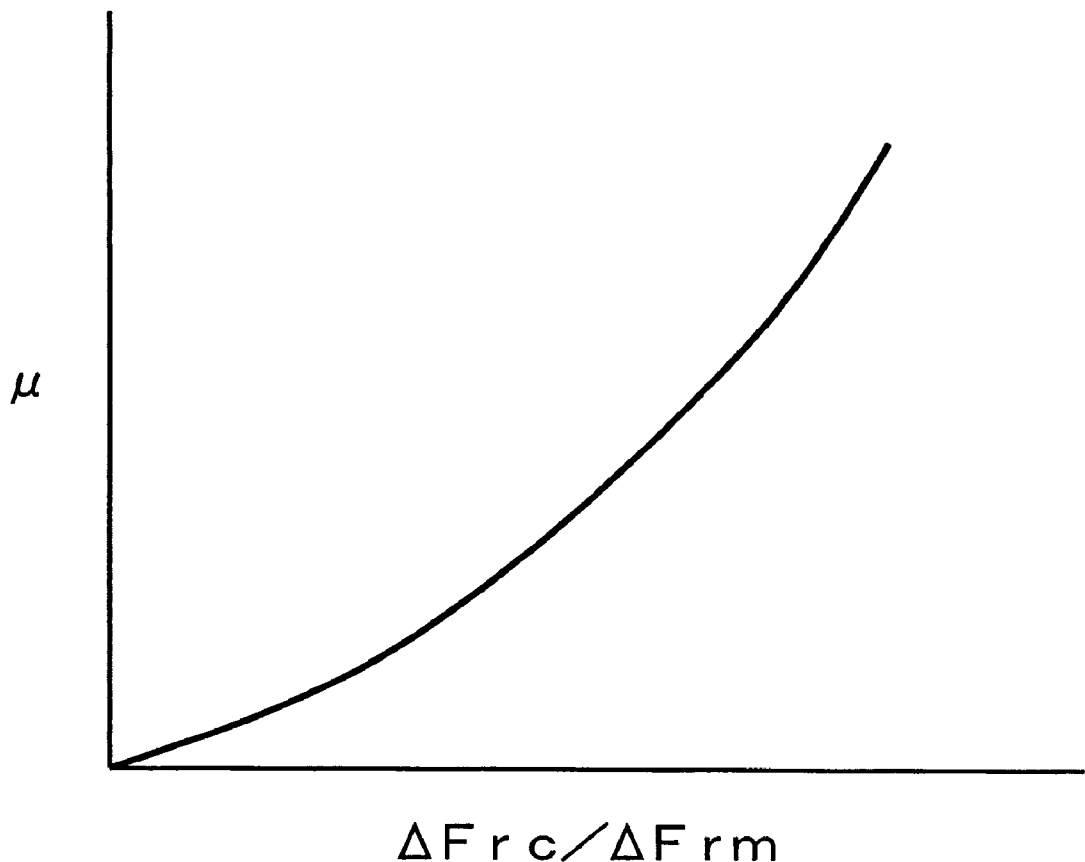
FIG. 6 is a graph showing the map for determining the road frictional coefficient.

The increases of the actual and model rack shaft reaction Frc and Frm for a given increase of the steering wheel angle θs are obtained according to the actual rack shaft reaction Frc and the model rack shaft reaction Frm obtained as described above (see FIG. 5), and the road frictional coefficient μ can be estimated by looking up a pre-defined map for determining the road friction according to the ratio ΔFrc/ΔFrm of the actual rack shaft increase ratio ΔFrc/Δθs to the model rack shaft increase ratio ΔFrm/Δθs in a steering angle range in which the vehicle response can be approximated by a linear equation (see FIG. 6). The actual rack shaft reaction can also be directly measured by providing a force sensor such as a load cell in a suitable location of the knuckle arm 7, the tie rod 5 or the rack shaft 8.

Figure 7:
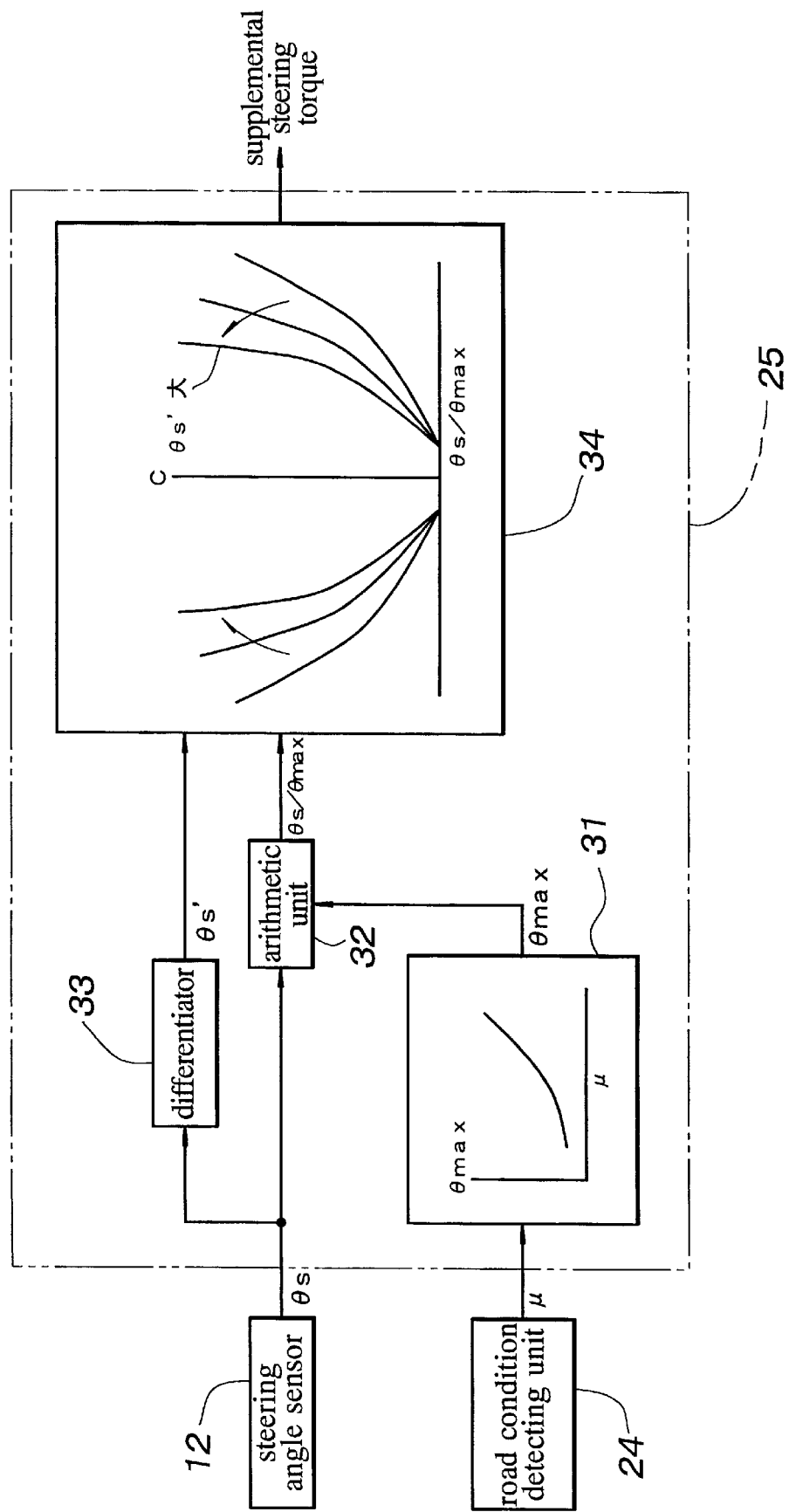
FIG. 7 is a block diagram of the supplemental steering torque computing unit.

Now the operation of this embodiment is described in the following with reference to FIG. 7. First of all, the road frictional coefficient μ is measured by the road condition detecting unit 24, and a maximum permissible steering angle θmax for the current road frictional coefficient μ is determined from a map 31 which defines the relationship between them. The ratio of the current or actual steering angle θs, which is measured by the steering angle sensor 12, to the maximum permissible steering angle θmax is computed by an arithmetic unit 32, and a corresponding supplemental steering torque C is looked up from a supplemental steering torque map 34 which gives the supplemental reaction for each steering angle ratio θs/θmax while taking into account the steering angular speed θs' which is obtained by processing the output θs of the steering angle sensor 12 with a differentiator 33. This supplemental steering torque C is deducted from the target assist steering torque by the assist steering torque computing unit 21 of the assist steering torque control segment of the system. When the assist steering torque is reduced in this manner, the vehicle operator can sense an increase in the force required to turn the steering wheel 1, and is prevented from steering excessively so that the vehicle can be properly controlled even on slippery road surfaces.

When the steering angular speed θs' is high, the steering energy due to the inertia of the steering system becomes so great that the normal supplementary steering torque control may not be adequate in controlling excessively steering. Therefore, according to the present invention, the magnitude of the supplemental steering torque for a given steering angle ratio θs/θmax is made dependent on the steering angular speed θs'. Generally, as the steering angular speed θs' increases, the supplemental steering torque is increased so as to increase the resistance to the steering effort. Thus, the effort required to turn the steering wheel is properly controlled by the supplemental steering torque so that the steering stability of the vehicle can be ensured without regard to the speed of turning the steering wheel. In other words, because the steering assist torque is controlled by taking into account both the road surface condition and the steering speed, the vehicle operator can sense and be properly guided by the steering resistance which he experiences without regard to the steering speed.

Although the present invention has been described in terms of a specific embodiment thereof, it is possible to modify and alter details thereof without departing from the spirit of the present invention.

What we claim is:

1. A steering control system for a motor vehicle, comprising:

steering torque detecting means for detecting a steering input torque applied to an input end of a steering system;

steering angle detecting means for detecting a steering angle;

steering angular speed detecting means for detecting a change rate of the steering angle;

means for estimating a frictional coefficient of a road surface on which said vehicle is traveling;

maximum steering angle defining means for defining a maximum permissible steering angle according to a frictional coefficient estimated by said frictional coefficient estimating means; and target torque computing means for determining a target output torque of a power actuator for said steering system according to outputs from said steering torque detecting means, said steering angle detecting means, said steering angular speed detecting means, and said maximum steering angle defining means.

2. A steering control system of a vehicle according to claim 1, wherein said target output torque of said power actuator is reduced from a normal value, which is computed according to a magnitude of the detected steering angle in relation with said maximum permissible steering angle, in dependence on a magnitude of said steering angle change rate.

3. A steering control system of a vehicle according to claim 1, wherein said target output torque is given as an assist steering torque minus a supplemental steering torque, and said target torque computing means comprises assist steering torque computing means for computing said assist steering torque according to the output from said steering torque detecting means, and supplemental steering torque computing means for computing said supplemental steering torque according to the outputs from said steering angle detecting unit, said steering angular speed detecting unit, and said frictional coefficient estimating means.

4. A steering control system of a vehicle according to claim 3, wherein said frictional coefficient estimating means comprises a vehicle model for providing a reference rack reaction with respect to a given steering angle, rack reaction measuring means for measuring an actual rack reaction, and computing means for giving a road frictional coefficient according to a ratio of increments of said reference rack reaction and said actual rack reaction for a given increment of said steering angle.

5. A steering control system of a vehicle according to claim 1, wherein said steering torque detecting means comprises a torque sensor provided in a path of torque transmission from a steering wheel to a steering mechanism.

6. A steering control system of a vehicle according to claim 1, wherein said steering angle detecting means comprises a steering angle sensor for detecting a turning angle of a steering shaft extending from a steering wheel.

7. A steering control system of a vehicle according to claim 6, wherein said steering angular speed detecting means comprises a differentiator for differentiating an output of said steering angle sensor with respect to time.

8. A steering control system of a vehicle according to claim 1, wherein said power actuator comprises an electric motor, and said actual rack reaction is computed from said steering torque, and an electric voltage and an electric current supplied to said electric motor.

9. A steering control system of a vehicle according to claim 1, wherein said power actuator comprises an electric motor, and said change rate of said steering angle is computed from an electromotive force produced in said electric motor.

* * * * *